April 1, 1930.  W. C. SLEEMAN  1,752,704

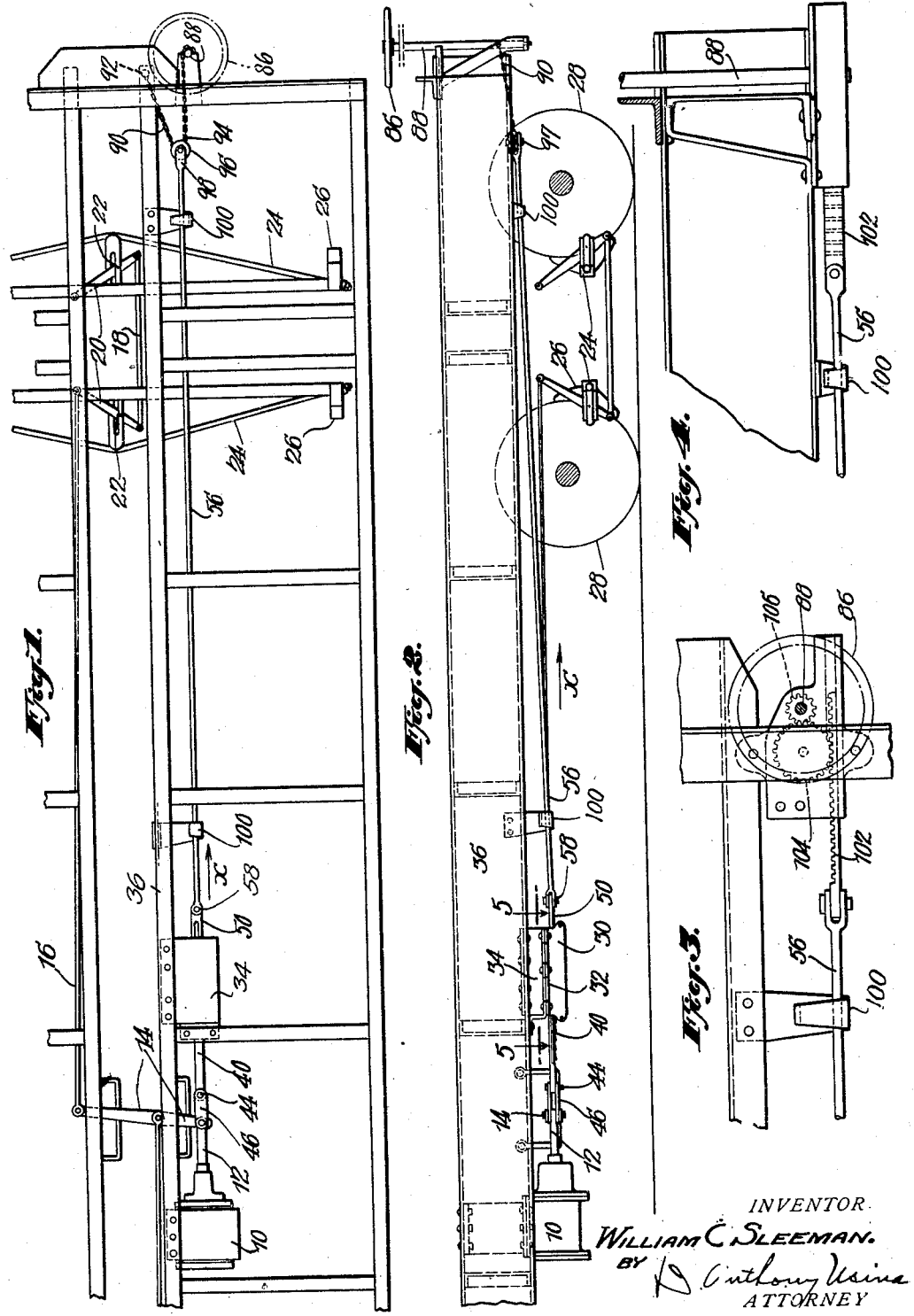

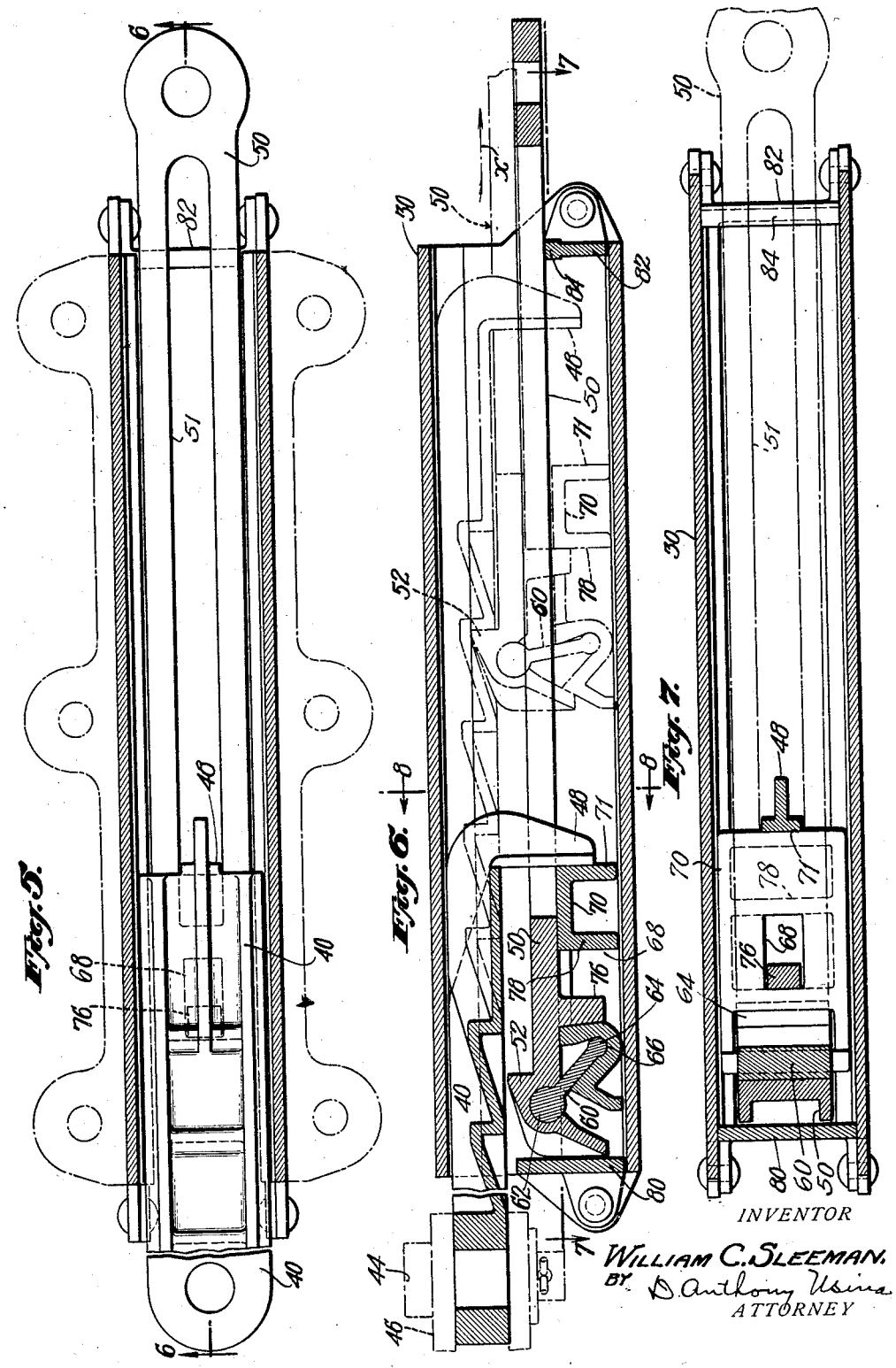

RAILWAY BRAKE EQUIPMENT

Filed May 9, 1928   3 Sheets-Sheet 3

INVENTOR
WILLIAM C. SLEEMAN.
BY
ATTORNEY

Patented Apr. 1, 1930

1,752,704

UNITED STATES PATENT OFFICE

WILLIAM C. SLEEMAN, OF BIRMINGHAM, ALABAMA

RAILWAY BRAKE EQUIPMENT

Application filed May 9, 1928. Serial No. 276,311.

This invention relates to railway brake equipment and aims to provide an attachment for increasing the efficiency of various standard types of hand brakes.

In hand brakes heretofore used it is necessary to expend an excessive amount of work in turning the hand brake wheel or hand lever when taking up the necessary slack in the usual chain connection between the standard hand brake equipment and the air brake equipment. In my improved apparatus means are provided whereby the hand brake actuating mechanism is normally disconnected from the usual braking equipment but immediately upon actuation of the hand mechanism an operative connection is established so that the hand braking effort becomes effective.

The invention will be fully apparent from the following specification when read in connection with the accompanying drawings and will be pointed out with particularity in the appended claims. In the drawings—

Fig. 1 is a skeleton plan view of one end of a railway car having a standard or conventional form of brake equipment and showing the application of my invention thereto;

Fig. 2 is a side elevation of the parts shown in Fig. 1;

Fig. 3 is a detail showing a modified arrangement for actuating the hand operated brake rod;

Fig. 4 is a side elevation of Fig. 3;

Fig. 5 is a horizontal section on line 5—5 of Fig. 2;

Fig. 6 is a longitudinal section on line 6—6 of Fig. 5;

Fig. 7 is a horizontal section on line 7—7 of Fig. 6;

Figure 8:
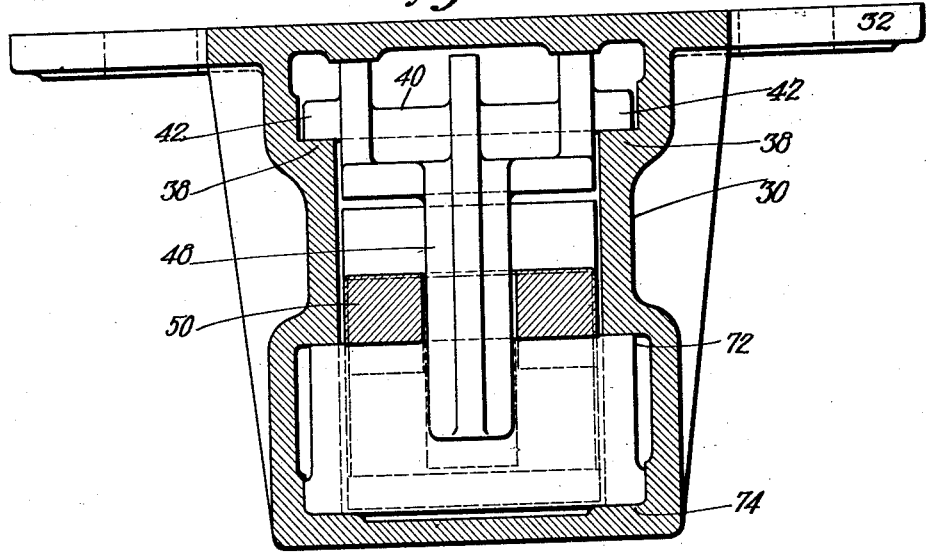
Fig. 8 is a transverse section on line 8—8 of Fig. 6.
Figure 9:
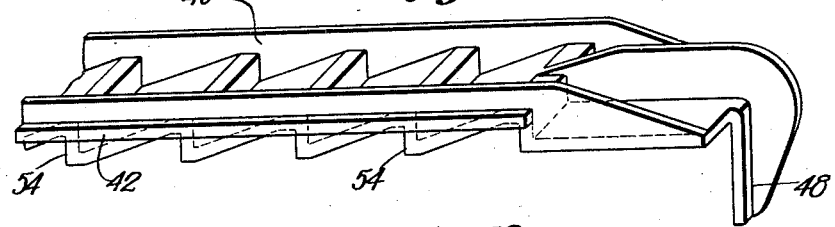
Fig. 9 is a perspective detail view of one end of a toothed member adapted to be connected with the standard brake apparatus.
Figure 10:
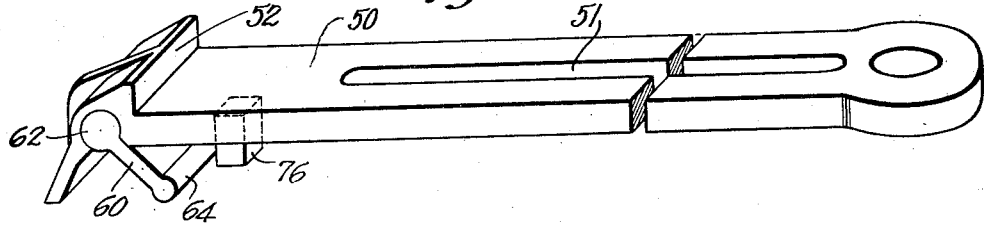
Fig. 10 is a detail perspective view of a latch adapted to be connected with the hand brake.
Figure 11:
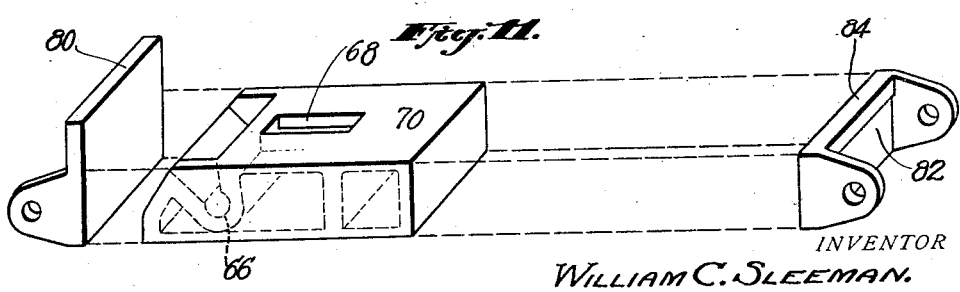
Fig. 11 is a skeleton perspective view illustrating a slidable bearing member for co-operation with the supporting toggle of the latch member of Fig. 10.

Referring in detail to the drawings, 10 represents a standard air brake cylinder which is adapted to actuate the usual push rod 12 which is connected to one end of a brake lever 14 which in turn is connected through rods 16 and 18 with the usual inclined truck levers 20 which are fulcrumed at 22 to the brake beams 24 carrying the usual brake shoes 26. When the brake rod 12 is forced outwardly under influence of fluid in the cylinder 10 the shoes exert a braking action on the wheels 28.

The brake equipment above described briefly may be of any usual or suitable standard design.

In railway equipment in addition to the air brake mechanism, it is customary to provide an auxiliary hand brake which is normally operatively connected with the air brake apparatus. The connection is usually in the form of rods or chains and in order to prevent interference between the two in normal operation, a suitable amount of slack is usually provided for. Therefore, when the brakes are to be applied by hand, it is apparent that such slack must be taken up before any braking effort is applied to the wheels.

With my improved apparatus this handicap is overcome because normally the manually operated brake mechanism is disconnected from the air actuated mechanism and means are provided whereby an operative connection between the manually operated device and the usual brake equipment is established upon the actuation of the hand brake.

To these ends, I provide a self-contained unit comprising a housing 30 which is provided with ears 32 adapted to be secured to a supporting plate or bracket 34 which in turn is secured to the underside of one of the car frame members 36.

The housing 30 is provided with interior guide-ways 38—38 which slidingly support a toothed member indicated as a whole by numeral 40, the latter having lateral extensions 42—42 which ride on the guides 38.

The member 40 is connected by pin 44 at one end with links 46 which in turn connect with the air-actuated push rod 12 and brake lever 14. At its opposite end the toothed member 40 is formed with a downwardly extending prong 48 which coacts with a bearing member to be hereinafter referred to.

The toothed member 40 as shown and described partakes of all movements of the air actuated push rod 12 and brake lever 14.

Located below the toothed member 40 and normally out of engagement therewith, is a latch member 50 having a single tooth 52 adapted to co-operate with any of the several teeth 54 formed on the underside of the member 40.

One end of the latch member 50 is pivotally secured to a hand-actuated brake rod 56 by means of a suitable connecting pin 58. At the opposite end in juxtaposition to the tooth 52, the latch member is movably supported on a swingable toggle member 60 having a journal portion 62 at one end which pivotally engages the latch and at the other end having a similar journal portion 64 seated in a socket 66 formed in a bearing member 70 slidable between the guide surfaces 72 and 74 formed in the housing 30. The bearing member 70 is slotted at 68 and a lug 76 depending from the latch member is free to partake of a limited relative movement within the slot, the parts being so arranged that when a pull is exerted on the latch member 50 through hand brake rod 56, the lug 76 will engage the flange 78 of the bearing member at the same time that the tooth 52 comes into engagement with the tooth 54 of the member 40, it being clear that a pull on the rod 56 will rock toggle 60, thus lifting the latch member into position for engagement with the toothed member 40.

The dotted lines in Fig. 6 illustrate the interengagement between latch member 50 and toothed member 40 upon pull of the hand-actuated brake rod 56. In this dotted position, it is assumed that before the pull was exerted the next to the right-hand end tooth was substantially in vertical alignment with the tooth 52 of the latch member. In the position shown in dotted lines, considerable travel of the brake rod 56 is assumed.

At the ends of the housing 30, I provide transversely extending stop members 80 and 82 which are riveted or otherwise secured to suitable lugs or extensions formed on the housing. The upper surface 74 of the stop member 82 provides a bearing surface over which the latch member 50 freely slides and on which surface it is supported when in its normal rest position.

In the normal operation of the air brake apparatus it will be understood that the push rod 12 will be moved to different positions, consequently the toothed member 40 will be moved relatively to the latch member 50. But inasmuch as member 40 is provided with a plurality of teeth 54, it is apparent that regardless of in what position the member 40 comes to rest, there will always be a tooth in position for coaction with the latch member 52 as soon as the same is lifted in response to a pull on the brake rod 56.

The brake rod 56 may be manually actuated in the usual manner by means of a hand wheel 86 secured to a vertical shaft 88 having a hand brake chain 90 pinned thereto at one end, the other end of said chain secured by a pin 92 to a fixed part of the car framing and the bight 94 of the chain engaging a sheave 96 carried in the forked end 98 of the hand brake rod 56.

The rod 56 is supported by any suitable guide brackets such as indicated at 100. As thus arranged, it is clear that when the wheel 86 is manually operated, chain 90 will be wound around shaft 88 thus pulling the rod 56 and latch member 50 in the direction of the arrows, $x$ in Figs. 2 and 6. This pull on member 50 will rock toggle 60 so as to lift the latch from its normally inactive position to position for coaction with the member 40, whereupon, the continued pull on the rod 56 through link 46 and brake connections 14, 16, 20 and 18 will exert a manual braking action on the wheels 28. As soon as the manual pull on rod 56 is released, the latch member 50 will drop by gravity, thus breaking the engagement with the toothed member 40, and when air pressure is released from the brake cylinder 10 to release the brakes, the rod 12 will pull the toothed member 40 in the opposite direction to arrows $x$ and the depending prong 48, which rides freely through the slot 51 formed in the member 50, will engage the rear wall 71 of the bearing member 70 and return said bearing member and latch 50 to the starting position as shown in full lines in Fig. 6. The brake rod 56 instead of being actuated by the chain of Figs. 1 and 2 may alternatively be moved by means of rack 102 and pinion 104 driven by a gear 106 carried on a hand brake shaft and hand wheel 86.

Though I have described with great particularity the construction and operation of the particular embodiment of the invention illustrated, it is not to be construed that I am limited thereto since various modifications and substitution of equivalents may be made by those skilled in the art without departing from the invention as defined in the appended claims.

What I claim is:—

1. In combination with the brakes of a railroad car having both power actuated means and manually actuated means for applying the brakes, mechanism between said two means arranged to operatively connect them when the manually actuated means is operated and to break said connection automatically upon the release of said manually actuated means.

2. In combination with the brakes of a railroad car having both power actuated means and manually actuated means for applying the brakes, an automatically engageable and disengageable connection between said two means.

3. In combination with the brakes of a railroad car having both power actuated means and manually actuated means for applying the brakes, mechanism between said two means including a toothed bar and a latch and means for engaging the latch with said bar when said manually actuated means is operated.

4. In combination with the brakes of a railroad car, a power actuated member, a system of links and levers operatively connecting the brakes with said member, a manually operable member normally disconnected from said power actuated member, and means for automatically establishing a connection between them upon the actuation of said manually operable member.

5. In combination with the brakes of a railroad car, a power actuated member, a system of links and levers operatively connecting the brakes with said member, a manually operable member normally disconnected from said power-actuated member, a toothed member connected with said power-actuated member and means normally out of driving engagement with the toothed member arranged to be moved to engagement therewith upon the actuation of said manually operable member.

6. In combination with the brakes of a railroad car having a power actuated push rod, a system of links and levers operatively connecting the brakes with the push rod, a toothed member connected with said push rod, a manually operable brake rod, means connected with said brake rod normally disengaged from said toothed member and arranged to be moved into engagement therewith upon actuation of said brake rod.

7. In combination with the brakes and power actuating mechanism therefor, a housing, carrying a toothed member operatively connected with said brake actuating mechanism, a manually operable brake actuating member, means connected with the latter member arranged to be automatically moved to position for engagement with said toothed member upon actuation of said manually operable member.

8. In combination with the power brake equipment of a railway car, an auxiliary hand brake member normally disconnected from said brake equipment and means for automatically engaging the same with said brake equipment.

9. In an apparatus of the class described, a self-contained unit adapted to be secured to the underside of a railway car including a housing, a toothed member slidable in said housing adapted to be connected with the power brake equipment of a railway car, a latch member within said housing, a swingable support for said latch member, means slidable in said housing forming a bearing for said swingable support, and a manually operable member connected with said latch member.

10. In apparatus of the class described, a housing member adapted to be secured to the underside of a railway car, a toothed member slidable therein adapted to be connected with the usual brake equipment of the car, a latch member within said housing adapted to be connected with an auxiliary manually operable brake member, said latch member having a portion for engagement with said toothed member, a toggle member supporting the toothed end of said latch member and a bearing for said toggle member slidably mounted within said housing.

11. In apparatus of the class described, a housing member adapted to be secured to the underside of a railway car, a toothed member slidable therein adapted to be connected with the usual brake equipment of the car, a latch member having a portion for engagement with said toothed member, a toggle member supporting the toothed end of said latch member and a bearing for said toggle member slidably mounted within said housing, said latch member having an elongated slot therein and said toothed member having a projection extending through said slot and arranged for coaction with said slidable bearing.

In witness whereof, I have hereunto signed my name.

WILLIAM C. SLEEMAN.